US012485870B2

(12) United States Patent
Hirosumi et al.

(10) Patent No.: US 12,485,870 B2
(45) Date of Patent: Dec. 2, 2025

(54) VEHICLE

(71) Applicant: SUBARU CORPORATION, Tokyo (JP)

(72) Inventors: Naohiko Hirosumi, Tokyo (JP); Yuji Ohori, Tokyo (JP); Takahiro Uchimura, Tokyo (JP); Yasuhito Yamaguchi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 442 days.

(21) Appl. No.: 18/325,301

(22) Filed: May 30, 2023

(65) Prior Publication Data

US 2023/0398975 A1 Dec. 14, 2023

(30) Foreign Application Priority Data

Jun. 8, 2022 (JP) ................. 2022-093133

(51) Int. Cl.
*B60W 10/06* (2006.01)
*B60W 10/26* (2006.01)
*B60W 20/12* (2016.01)

(52) U.S. Cl.
CPC ............ *B60W 10/06* (2013.01); *B60W 10/26* (2013.01); *B60W 20/12* (2016.01); *B60W 2540/12* (2013.01); *B60W 2552/15* (2020.02); *B60W 2710/0633* (2013.01)

(58) Field of Classification Search
CPC ...... B60W 10/06; B60W 10/24; B60W 10/26; B60W 10/30; B60W 20/12; B60W 20/13; B60W 20/14
See application file for complete search history.

(56) References Cited

U.S. PATENT DOCUMENTS

| | | | | |
|---|---|---|---|---|
| 10,744,892 B2 * | 8/2020 | Bell | .................. | B60L 15/20 |
| 11,358,583 B2 * | 6/2022 | Takasu | .................. | B60W 10/26 |
| 11,433,878 B2 * | 9/2022 | Choi | .................. | F02D 41/0007 |
| 11,554,782 B2 * | 1/2023 | Park | .................. | B60W 20/15 |
| 11,584,354 B2 * | 2/2023 | Choi | .................. | B60W 10/26 |
| 12,115,972 B2 * | 10/2024 | Lee | .................. | B60W 20/13 |
| 2023/0398975 A1 * | 12/2023 | Hirosumi | .................. | B60W 10/26 |

FOREIGN PATENT DOCUMENTS

JP 2004-270602 A 9/2004

\* cited by examiner

*Primary Examiner* — Jeffrey J Restifo
(74) *Attorney, Agent, or Firm* — Rimon P.C.

(57) ABSTRACT

A vehicle includes: an engine that generates driving force; a motor-generator that generates driving force; a battery electrically coupled to the motor-generator; an electric supercharger that compresses air with electric power supplied by the battery and to supply the compressed air to the engine; a navigation device that determines a route; and a control device including at least one processor and at least one memory coupled to the processor. The at least one processor performs processing including: identifying a downhill section in which a downhill slope on the route is located; determining, based on a state of charge of the battery at present time, an endpoint estimated state of charge of the battery at a point in time when the vehicle reaches an endpoint of the downhill section; and turning on the electric supercharger when the endpoint estimated state of charge is greater than or equal to a predetermined value.

8 Claims, 14 Drawing Sheets

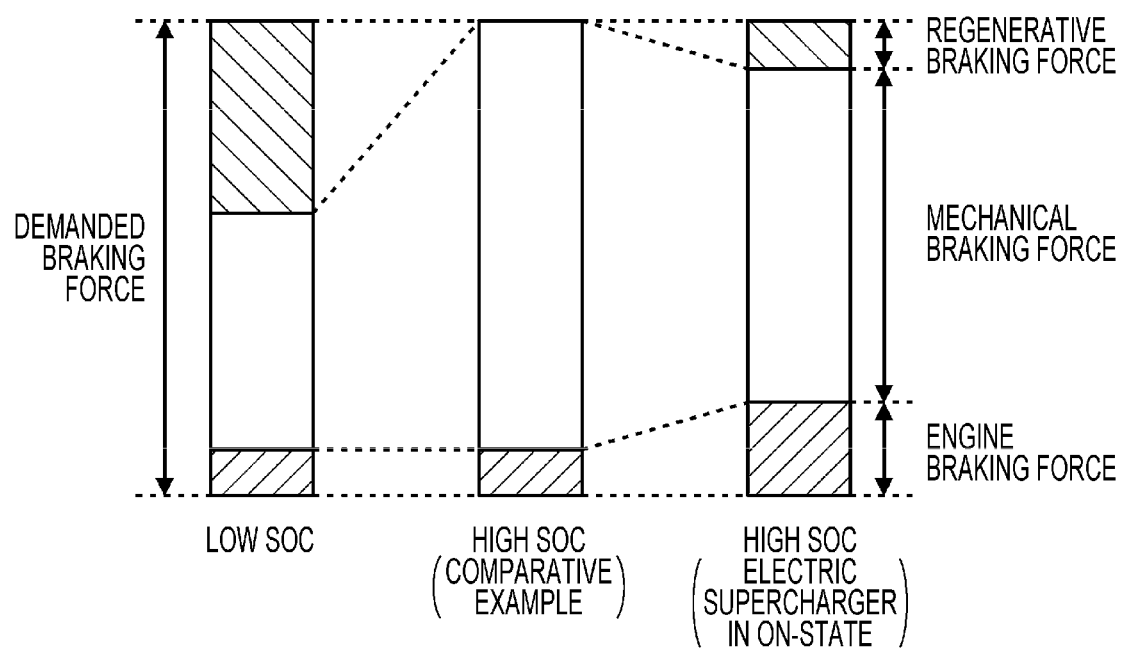

VEHICLE

CROSS-REFERENCE TO RELATED APPLICATIONS

The present application claims priority from Japanese Patent Application No. 2022-093133 filed on Jun. 8, 2022, the entire contents of which are hereby incorporated by reference.

BACKGROUND

The disclosure relates to a vehicle.

An engine disclosed in Japanese Unexamined Patent Application Publication No. 2004-270602 includes: a regenerative power generator coupled to a crankshaft to serve as a regeneration brake unit; and an electric supercharger configured to compress air and to supply the compressed air to a cylinder. When the battery is fully charged, regenerative electric power generated by the regenerative power generator of the engine is supplied to the electric supercharger.

SUMMARY

An aspect of the disclosure provides a vehicle. The vehicle includes an engine configured to generate generating driving force, a motor-generator configured to generate driving force, a battery, an electric supercharger, a navigation device, and a control device. The battery is electrically coupled to the motor-generator. The electric supercharger is configured to compress air by using electric power supplied by the battery and to supply the compressed air to the engine. The navigation device is configured to determine a route that is a projected path of travel of the vehicle. The control device includes at least one processor and at least one memory coupled to the at least one processor. The at least one processor is configured to perform processing including: identifying a downhill section in which a downhill slope on the determined route is located; while the vehicle traveling the identified downhill section, determining an endpoint estimated state of charge based on a state of charge of the battery at present time that is an estimated value of the state of charge of the battery at a point in time when the vehicle reaches an endpoint of the downhill section; and turning on the electric supercharger when the endpoint estimated state of charge is greater than or equal to a predetermined state-of-charge reference value.

An aspect of the disclosure provides a vehicle. The vehicle includes an engine configured to generate driving force, a motor-generator configured to generate driving force, a battery, an electric supercharger, a switch, and a control device. The battery is electrically coupled to the motor-generator. The electric supercharger is configured to compress air by using electric power supplied by the battery and to supply the compressed air to the engine. The switch is configured to be set to an on-state or an off-state in accordance with an input operation performed by a driver who drives the vehicle on a downhill slope. The control device includes at least one processor and at least one memory coupled to the at least one processor. The at least one processor is configured to perform processing including: keeping speed of the vehicle from exceeding a predetermined value when the switch is in the on-state; and turning on the electric supercharger when 1) the switch is in the on-state, and 2) a state of charge of the battery is greater than or equal to a predetermined state-of-charge reference value.

An aspect of the disclosure provides a vehicle. The vehicle includes an engine configured to generate driving force, a motor-generator configured to generate driving force, a battery, an electric supercharger, a braking sensor, an inclination sensor, and a control device. The battery is electrically coupled to the motor-generator. The electric supercharger is configured to compress air by using electric power supplied by the battery and to supply the compressed air to the engine. The braking sensor is configured to detect a brake operation performed by a driver who drive the vehicle. The inclination sensor is configured to measure inclination of a road surface on which the vehicle is traveling. The control device includes at least one processor and at least one memory coupled to the processor. The at least one processor is configured to perform processing including turning on the electric supercharger on conditions that 1) the brake operation is detected by the braking sensor, 2) an absolute value of downward inclination measured by the inclination sensor is greater than or equal to a predetermined inclination reference value, and 3) a state of charge of the battery is greater than or equal to a predetermined state-of-charge reference value.

BRIEF DESCRIPTION OF THE DRAWINGS

The accompanying drawings are included to provide a further understanding of the disclosure and are incorporated in and constitute a part of this specification. The drawings illustrate embodiments and, together with the specification, serve to describe the principles of the disclosure.

FIGS. 2A to 2C illustrate braking force exerted on the vehicle in the deceleration state or on a downhill slope;

DETAILED DESCRIPTION

Figure 1:
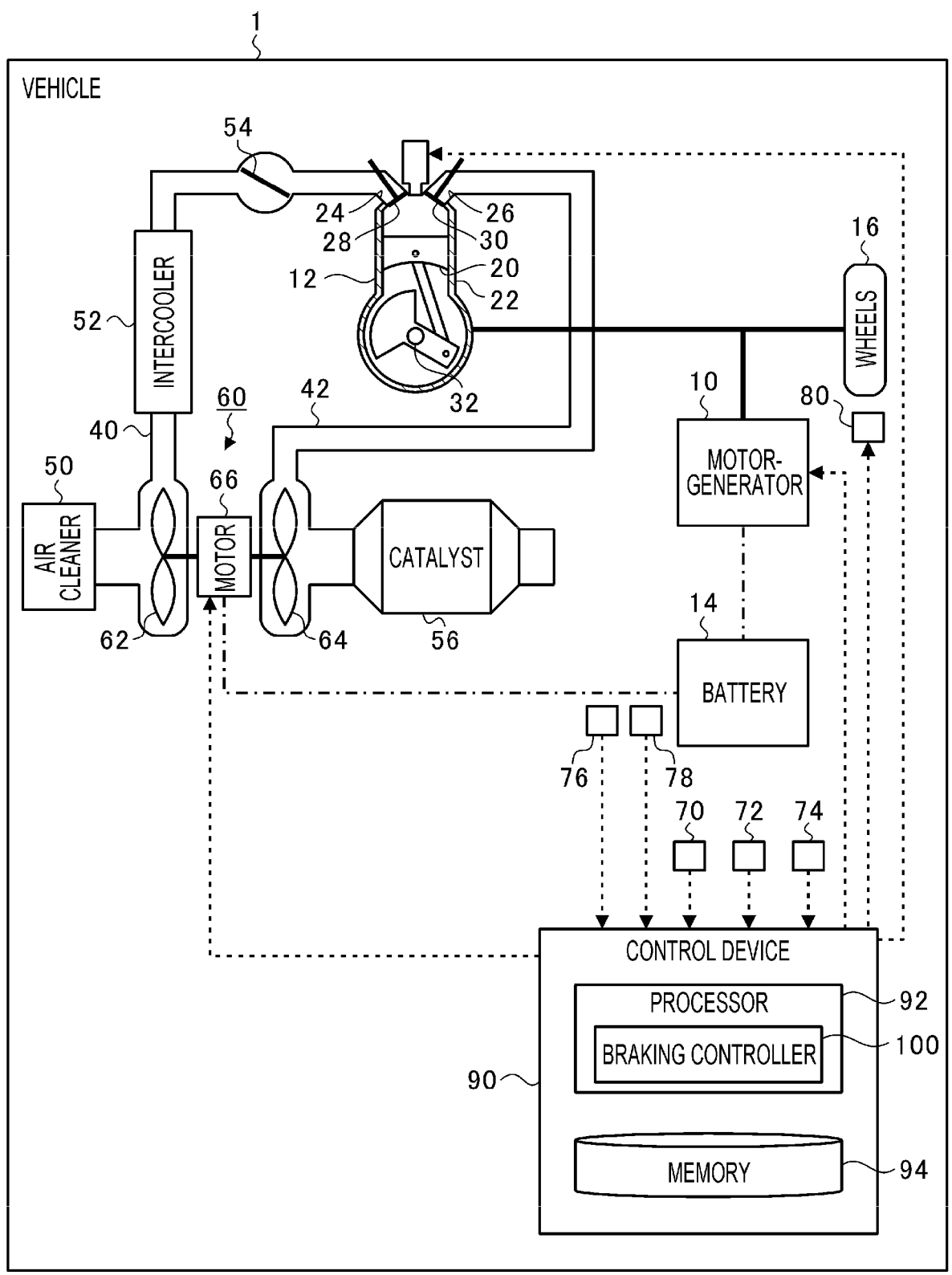
FIG. 1 is a schematic diagram illustrating the configuration of a vehicle according to an embodiment.

Examples of the braking force that is to be used to apply brakes to a vehicle include engine braking force exerted by an engine and regenerative braking force exerted by the regenerative action of a motor-generator, as well as mechanical braking force exerted by a mechanical brake device. When the battery of the vehicle is at a relatively high level of state of charge (SOC), brakes are applied to the vehicle by using the mechanical braking force and the engine braking force, without the motor-generator performing the regenerative action. For example, applying brakes for a relatively long time to a vehicle traveling a downhill slope causes the brake device to labor to exert mechanical braking force. This can accelerate the deterioration of the brake device.

It is desirable to provide a vehicle that enables appropriate application of brakes when the vehicle is traveling a downhill slope.

Embodiments of the disclosure will be described below in detail with reference to the accompanying drawings. Details such as dimensions, materials, and values relevant to the embodiments will be mentioned to facilitate the understanding of the disclosure and are not to be construed as limiting the scope of the disclosure unless otherwise specified. Elements having substantially the same function and configuration are denoted by the same reference sign throughout the specification and the accompanying drawings, and redundant description thereof will be omitted. Elements that are not directly relevant to the disclosure are not illustrated in the drawings.

First Embodiment

FIG. 1 is a schematic diagram illustrating the configuration of a vehicle 1 according to a first embodiment. The vehicle 1 is a hybrid automobile including a motor-generator for generating driving force and an engine for generating driving force. The motor-generator and the engine are herein denoted by 10 and 12, respectively.

The vehicle 1 includes a battery 14, which supplies the motor-generator 10 with electric power. For example, the battery 14 is a lithium-ion battery; that is, the battery 14 is a rechargeable secondary battery.

The motor-generator 10 is electrically coupled to the battery 14 with an inverter (not illustrated) therebetween. This is indicated by a dash-dot line in FIG. 1. When powered by the battery 14, the motor-generator 10 serves as a motor and runs under electric power supplied by the battery 14. The motor-generator 10 is coupled to wheels 16. The driving force generated by the rotation motion of the motor-generator 10 can be transmitted to the wheels 16 of the vehicle 1.

While the vehicle 1 is decelerating or traveling a downhill slope, the motor-generator 10 serves as an electric generator that generates electric power in accordance with the rotation of the wheels 16. The electric power generated by the motor-generator 10 is supplied to the battery 14, which becomes charged accordingly. That is, the motor-generator 10 is capable of recovering energy in the regeneration process in which the energy generated by the rotation of the wheels 16 is converted into electric energy. As the motor-generator 10 performs the regenerative action, the braking force is exerted on the wheels 16 such that the vehicle 1 is caused to decelerate. The braking force generated by the regenerative action of the motor-generator 10 is hereinafter also referred to as regenerative braking force.

The engine 12 includes a piston 20, a cylinder 22, an intake port 24, an exhaust port 26, an intake valve 28, and an exhaust valve 30. The piston 20 is housed in the cylinder 22, with the piston 20 being slidable in the cylinder 22. The intake port 24 and the exhaust port 26 communicate with the inside of the cylinder 22. The intake valve 28 enables opening and closing of the intake port 24. The exhaust valve 30 enables opening and closing of the exhaust port 26.

When the intake valve 28 is open, air enters the cylinder 22 through the intake port 24. Fuel is injected into the cylinder 22. The piston 20 slides up and down in the cylinder 22 due to combustion of an air-fuel mixture in the cylinder 22. The sliding motion of the piston 20 causes a crankshaft 32 to rotate. The crankshaft 32 is coupled to the wheels 16. The driving force generated by the sliding motion of the piston 20 can be transmitted to the wheels 16 of the vehicle 1 by way of the crankshaft 32.

When the power output of the engine is small in comparison to the load, the engine 12 exerts braking force on the wheels 16 to cause the vehicle 1 to decelerate. The braking force generated by the engine 12 is hereinafter also referred to as engine braking force.

When the exhaust valve 30 is open, gas in the cylinder 22 is discharged out of the cylinder 22 through the exhaust port 26.

The vehicle 1 includes an intake passage 40 and an exhaust passage 42. The intake passage 40 leads to the intake port 24. The air flowing through the intake passage 40 is taken into the cylinder 22 through the intake port 24. The exhaust passage 42 leads to the exhaust port 26. The air flowing through the exhaust passage 42 is discharged out of the cylinder 22 through the exhaust port 26.

The intake passage 40 is provided with an air cleaner 50, an intercooler 52, and a throttle valve 54, which are disposed in sequence in the direction in which the air flows through the intake passage 40. The air cleaner 50 removes foreign matter from air that is to be taken into the intake passage 40. The intercooler 52 cools air flowing through the intake passage 40. The throttle valve 54 adjusts the air intake of the cylinder 22 in accordance with the accelerator input from a driver who drives the vehicle 1.

The exhaust passage 42 is provided with a catalyst 56. For example, the catalyst 56 is a three-way catalyst. The catalyst 56 cleans gas discharged out of the cylinder 22.

The vehicle 1 includes an electric supercharger 60. The electric supercharger 60 includes a compressor 62, an exhaust turbine 64, and a motor 66. The compressor 62 is disposed on the intake passage 40. For example, the compressor 62 is disposed between the air cleaner 50 and the intercooler 52 on the intake passage 40. The exhaust turbine 64 is disposed on the exhaust passage 42. For example, the exhaust turbine 64 is disposed between the exhaust port 26 and the catalyst 56 on the exhaust passage 42. The flow of gas in the exhaust passage 42 causes the exhaust turbine 64 to spin.

The motor 66 is coupled to the compressor 62. The exhaust turbine 64 is coupled to the compressor 62 with the motor 66 therebetween. The motor 66 is electrically coupled to the battery 14 with an inverter (not illustrated) therebetween. This is indicated by a dash-dot line in FIG. 1. The motor 66 drives the compressor 62 by using electric power supplied by the battery 14. The compressor 62 of the electric supercharger 60 may be driven in accordance with the spin of the exhaust turbine 64.

The compressor 62 compresses air taken into the intake passage 40 through the air cleaner 50 and feeds the compressed air into the intercooler 52. The air supplied to the intercooler 52 is taken in through the throttle valve 54 and the intake port 24 and enters the cylinder 22. That is, the electric supercharger 60 compresses air by using electric power supplied by the battery 14 and supplies the compressed air to the engine 12.

Although the mechanism by which the motor 66 drives the compressor 62 and the mechanism by which the exhaust turbine 64 drives the compressor 62 are integrated into the electric supercharger 60 in FIG. 1, the mechanism by which the exhaust turbine 64 drives the compressor 62 is optional; that is, the mechanism by which the motor 66 drives the compressor 62 is to be included in the electric supercharger 60. In addition to the electric supercharger 60 including the motor 66 and the compressor 62 configured to be driven by the motor 66, a mechanical supercharger including an exhaust turbine and another compressor 62 configured to be driven by the exhaust turbine may be included in the vehicle 1.

The vehicle 1 includes a speed sensor 70, a braking sensor 72, an inclination sensor 74, a voltage sensor 76, and a current sensor 78. The speed sensor 70 determines the speed of the vehicle 1. The braking sensor 72 may be installed on a brake pedal to determine the braking operation amount that is the degree of brake pedal depression by the driver. The inclination sensor 74 determines, by means of an inertial measurement unit (IMU) or the like, the inclination of the road surface on which the vehicle 1 is traveling. The voltage sensor 76 determines the voltage across the terminals of the battery 14. The current sensor 78 determines the amount of current flowing between the terminals of the battery 14.

The vehicle 1 includes a brake device 80. For example, the brake device 80 is a disc brake or a drum brake. The brake device 80 is configured to inhibit rotation of the wheels 16 in mechanical manner. The brake device 80 is operated by hydraulic power. The braking force generated by the brake device 80 is hereinafter also referred to as mechanical braking force.

The vehicle 1 includes a control device 90. The control device 90 includes at least one processor and at least one memory coupled to the at least one processor. The processor and the memory are denoted by 92 and 94, respectively. The memory 94 includes ROM and RAM. Programs and the like are stored in the ROM. The RAM is a work area. The processor 92 executes programs to exercise an overall control of the vehicle 1. For example, the processor 92 controls the operation of the engine 12 and the operation of the motor-generator 10.

The processor 92 may execute programs to serve as a braking controller 100. When the driver operates the brake pedal, the braking controller 100 determines the demanded braking force on the basis of the braking operation amount determined by the braking sensor 72. The demanded braking force is the magnitude of the braking force demanded by the driver. The braking controller 100 exercises braking control on the vehicle 1 in accordance with the demanded driving force such that the vehicle 1 decelerates. The braking controller 100 will be described in detail later.

FIGS. 2A to 2C illustrate braking force exerted on the vehicle 1 in the deceleration state or on a downhill slope. FIG. 2A illustrates an example of the state in which the state-of-charge (SOC) of the battery 14 is at a relatively low level. FIG. 2B illustrates a comparative example in which the SOC of the battery 14 is at a relatively high level, with the electric supercharger 60 being left turned off during deceleration. FIG. 2C illustrates an example of the first embodiment in which the SOC of the battery 14 is at a relatively high level, with the electric supercharger 60 being turned on during deceleration.

The braking controller 100 is capable of determining the SOC of the battery 14 on the basis of measurements obtained by the voltage sensor 76 or measurements obtained by the current sensor 78. SOC is the percentage of charge currently available in a battery with respect to the full-charge capacity.

When the SOC is at a relatively low level, the battery 14 can receive electric power generated by the regenerative action of the motor-generator 10. As illustrated in FIG. 2A, components of the demanded braking force may be engine braking force, mechanical braking force, and regenerative braking force. In other words, the engine braking force, the mechanical braking force, and the regenerative braking force amount to the demanded braking force.

When the SOC of the battery 14 is close to 100%, the battery 14 can hardly receive the supply of electric power. For this reason, the motor-generator 10 does not perform the regenerative action. Thus, components of the demanded braking force in the comparative example in FIG. 2B are engine braking force and mechanical braking force.

When the regenerative braking force is not involved in the braking as in FIG. 2B, the proportion of the mechanical braking force in the aggregate force corresponding to the demanded braking force is higher than would be expected with the presence of the regenerative braking force. For example, applying brakes for a relatively long time to the vehicle 1 traveling a downhill slope causes the brake device 80 to labor to exert mechanical braking force. This can accelerate the deterioration of the brake device 80.

As a workaround, the braking controller 100 of the vehicle 1 according to the first embodiment turns on the electric supercharger 60 upon satisfaction of predetermined conditions: 1) the braking operation is detected by the braking sensor 72; 2) the absolute value of downward inclination measured by the inclination sensor 74 is greater than or equal to a predetermined inclination reference value; and 3) the SOC of the battery 14 is greater than or equal to a predetermined SOC reference value.

For example, the predetermined inclination reference value is 5°; nevertheless, the predetermined inclination reference value may be any value large enough to discriminate a downhill road surface from road surfaces that are not slanted. For example, the predetermined SOC reference value is 75%; nevertheless, the predetermined SOC reference value may be any value large enough to determine whether the SOC is at a relatively high level. That is, the electric supercharger 60 of the vehicle 1 according to the first embodiment is turned on when the driver demands the application of brakes to the vehicle 1 traveling a downhill slope in a state in which the SOC is at a relatively high level.

When the electric supercharger 60 is in the on-state, the electric supercharger 60 consumes electric power supplied by the battery 14. With the SOC being close to 100%, the electric supercharger 60 consumes electric power, in which case the motor-generator 10 can generate electric power equivalent to the power consumption of the electric supercharger 60.

As illustrated in FIG. 2C, the regenerative braking force may thus be obtained by the vehicle 1 according to the first embodiment as part of the aggregate force corresponding to the demanded braking force when the SOC is at a relatively high level. Accordingly, the proportion of the mechanical braking force in the aggregate force corresponding to the demanded braking force is lower in the first embodiment than in the comparative example illustrated in FIG. 2B. The vehicle 1 according to the first embodiment can thus slow down the rate of deterioration of the brake device 80.

The amount of air fed into the cylinder 22 by the electric supercharger 60 in the on-state is greater than would be possible with the electric supercharger 60 in the off-state such that the piston 20 sliding in the cylinder 22 encounters increased air resistance.

For this reason, the engine braking force exerted in the state in which the electric supercharger 60 is turned on is greater than the engine braking force exerted in the state in which the electric supercharger 60 is turned off. This can be understood from FIG. 2C. Accordingly, the proportion of the mechanical braking force in the aggregate force corresponding to the demanded braking force is further reduced such that the vehicle 1 according to the first embodiment can further slow down the rate of deterioration of the brake device 80.

Figure 3A:
FIGS. 3A to 3E illustrate an example of the workings of the vehicle according to the embodiment.
Figure 3B:
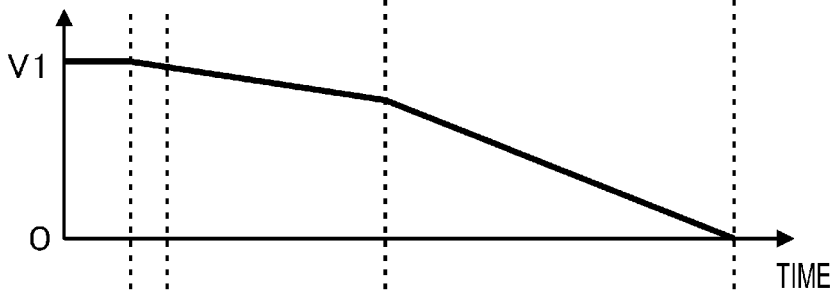
Figure 3C:
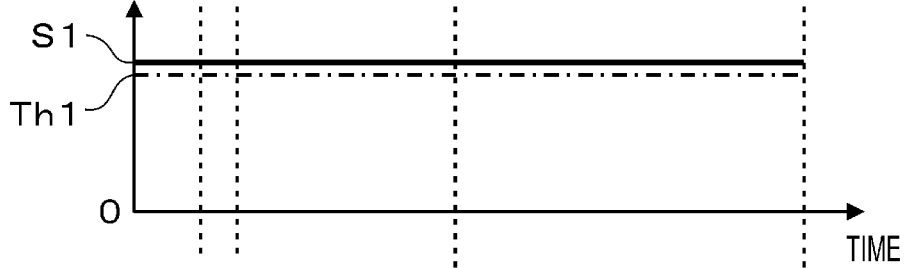
Figure 3D:
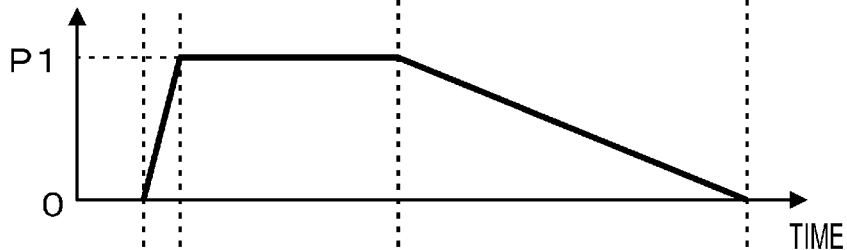
Figure 3E:
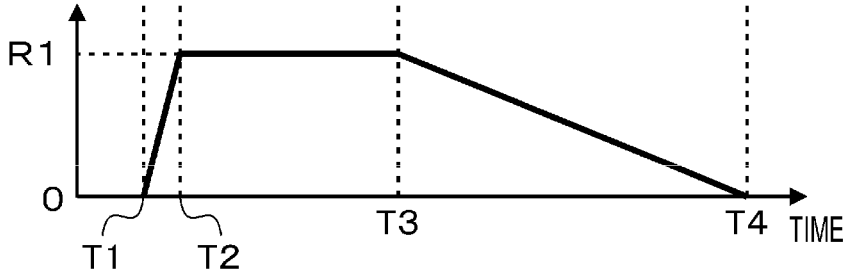

FIGS. 3A to 3E illustrate an example of the workings of the vehicle 1 according to the first embodiment. FIG. 3A illustrates an example of the chronological change in the braking operation amount determined by the braking sensor 72. FIG. 3B illustrates an example of the chronological change in the speed of the vehicle 1, where the speed is determined by the speed sensor 70. FIG. 3C illustrates an example of the chronological change in SOC. FIG. 3D illustrates an example of the chronological change in the power consumption of the electric supercharger 60. FIG. 3E illustrates an example of the chronological change in the regenerative electric power generated by the motor-generator 10. FIGS. 3A to 3E are graphs sharing the same timeline. FIGS. 3A to 3E concern a case in which the vehicle 1 travels a downhill slope and then stops.

Referring to FIG. 3A, the braking operation amount increases from zero and reaches Bmax at T1.

Referring to FIG. 3B, the speed of the vehicle 1 at T1 is V1, and the speed of the vehicle 1 decreases due to the increase in braking operation amount and falls to zero at T4.

Referring to FIG. 3C, the SOC at T1 is S1, which is higher than the SOC reference value denoted by Th1.

Based on these premises, the state at T1 is regarded as satisfying the following conditions: 1) the braking operation is detected; 2) the road surface is slanted downward; and 3) the SOC is greater than or equal to the SOC reference value. The braking controller 100 thus causes the electric supercharger 60 to make a transition from the off-state to the on-state at T1 (see FIG. 3D). Concurrently with the turning-on of the electric supercharger 60, the braking controller 100 causes the motor-generator 10 to start its regenerative action (see FIG. 3E).

For example, the power consumption of the electric supercharger 60 in the on-state varies according to the number of revolutions of the motor 66. The regenerative electric power generated by the regenerative action of the motor-generator 10 under the control of the braking controller 100 is substantially equivalent to the power consumption of the electric supercharger 60. When the regenerative electric power generated by the motor-generator 10 is substantially equivalent to the power consumption of the electric supercharger 60, the regenerative braking force can be generated despite the fact that the SOC is kept at the same level from T1 onward (see FIG. 3C).

For example, the power consumption of the electric supercharger 60 increases from T1 onward and reaches P1 at T2. The regenerative electric power generated by the motor-generator 10 is increased by the amount substantially equivalent to the power consumption of the electric supercharger 60 and reaches R1 at T2. R1 is substantially equal to P1. The power consumption of the electric supercharger 60 is kept at P1 during the time period from T2 to T3. Given that the power consumption of the electric supercharger 60 remains constant during the time period from T2 to T3, the regenerative electric power generated by the motor-generator 10 is kept at R1.

The regenerative electric power, which is the electrical generating capacity of the motor-generator 10, decreases as the vehicle 1 decelerates. Referring to FIG. 3E, the regenerative electric power generated by the motor-generator 10 is R1 at T3. From T3 onward, the regenerative electric power decreases and reaches zero at T4.

In light of this situation, the braking controller 100 causes the electric supercharger 60 to gradually decrease its power consumption, namely, power output from T3 onward in accordance with the speed of the vehicle 1 (see FIG. 3D). With the vehicle 1 decelerating during the time period from T3 to T4, the power consumption of the electric supercharger is brought substantially in agreement with the regenerative electric power generated by the motor-generator 10.

The example described above concerns the control by which the power consumption of the electric supercharger 60 is brought substantially in agreement with the regenerative electric power generated by the motor-generator 10. In some embodiments, however, the power consumption of the electric supercharger 60 and the regenerative electric power generated by the motor-generator 10 under the control of the braking controller 100 are not in agreement with each other. For example, the braking controller 100 may determine the magnitude of the power consumption of the electric supercharger 60 in operation, that is, the power output of the electric supercharger 60 in accordance with the SOC at the present time.

When the SOC at the present time is at a relatively low level within the range not less than the SOC reference value, the braking controller 100 may cause the electric supercharger 60 to output power greater than the magnitude of the regenerative electric power generated by the motor-generator 10. The battery 14 may thus be charged with electricity equivalent to what is left after subtracting the power consumption of the electric supercharger 60 from the regenerative electric power generated by the motor-generator 10 while the regenerative braking force is generated.

When the SOC at the present time is at a relatively high level within the range not less than the SOC reference value, the braking controller 100 may cause the electric supercharger 60 to output power less than the magnitude of the regenerative electric power generated by the motor-generator 10. The electric power stored in the battery 14 may thus be reduced by the amount equivalent to what left after subtracting the power consumption of the electric supercharger 60 from the regenerative electric power generated by the motor-generator 10 such that an appropriate reduction in the SOC of the battery 14 is achieved while the regenerative braking force is generated.

Figure 4:
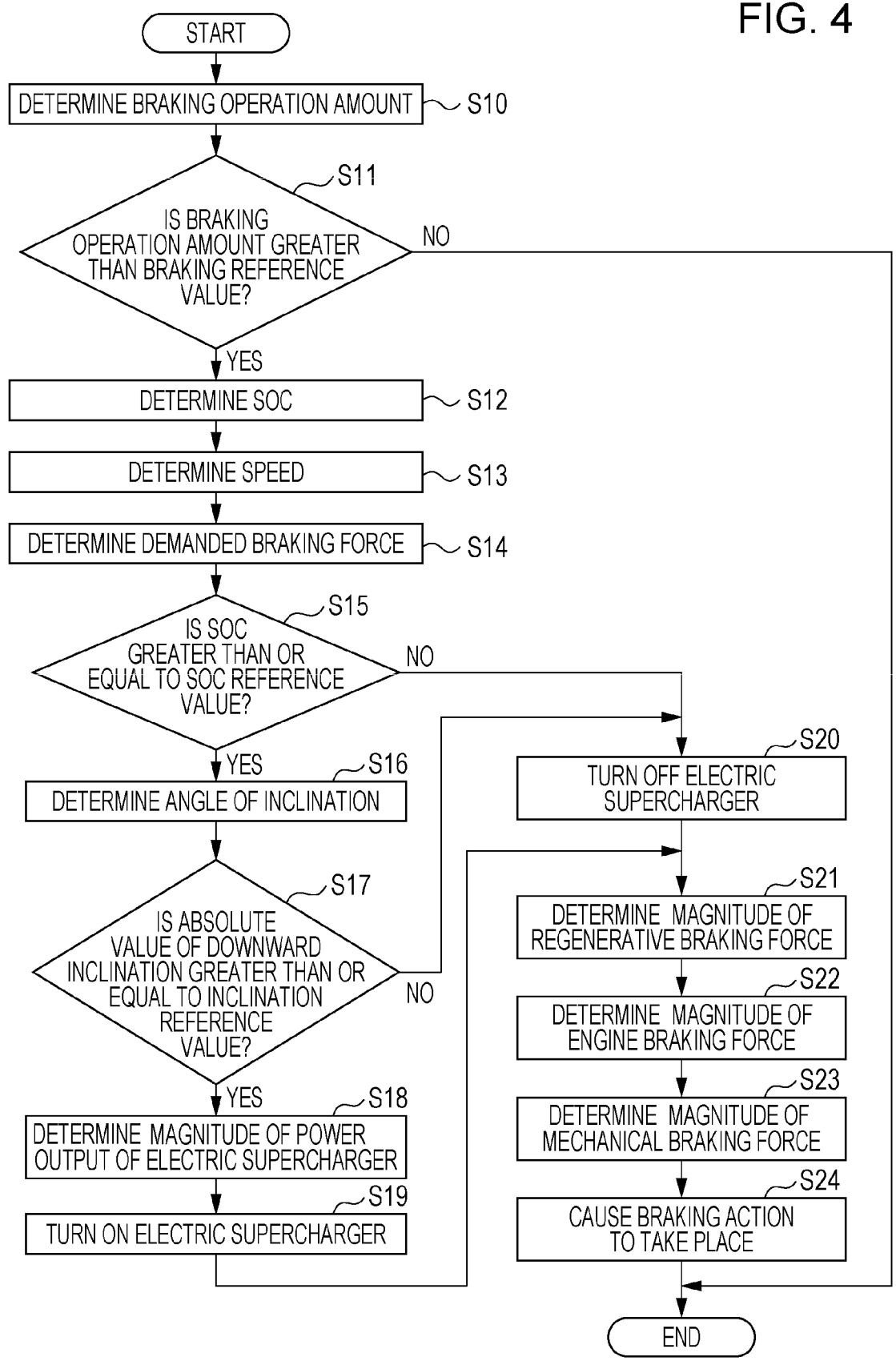
FIG. 4 is a flowchart for describing a procedure that is to be executed by a braking controller in the embodiment.

FIG. 4 is a flowchart for describing a procedure that is to be executed by the braking controller 100 in the first embodiment. The braking controller 100 executes the procedure in FIG. 4 periodically (upon the lapse of a predetermined interrupt period).

Upon the lapse of the predetermined interrupt period, the braking controller 100 determines the braking operation amount at the present time on the basis of the readings taken by the braking sensor 72 (S10). The braking controller 100 then determines whether the braking operation amount is greater than a predetermined braking reference value (S11). The predetermined braking reference value may be any value large enough to determine whether the braking operation is performed by the driver. When the braking operation amount is less than or equal to the braking reference value (NO in S11), the procedure is brought to an end.

When the braking operation amount is greater than the predetermined braking reference value (YES in S11), the braking controller 100 assumes that the braking operation is detected by the braking sensor 72, and the braking controller 100 thus determines the SOC of the battery 14 at the present time (S12). For example, the braking controller 100 derives the voltage across the input/output terminal of the battery 14 from the readings taken by the voltage sensor 76 and determines the SOC on the basis of the voltage. Subsequently, the braking controller 100 determines the speed of the vehicle 1 at the present time on the basis of the readings taken by the speed sensor 70 (S13).

The braking controller 100 then determine the demanded braking force at the present time on the basis of the braking operation amount at the present time and the speed at the present time (S14).

Subsequently, the braking controller 100 determines whether the SOC at the present time is greater than or equal to the SOC reference value (S15). When the SOC at the present time is greater than or equal to the SOC reference value (YES in S15), the braking controller 100 determines the angle of inclination of the road surface at the present position of the vehicle 1 on the basis of the readings taken by the inclination sensor 74 (S16).

The braking controller 100 determines whether the angle of inclination at the present time is indicative of the presence of a downhill slope and then determines whether the absolute value of the inclination of the downhill slope concerned at the present time is greater than or equal to the inclination reference value (S17).

When the absolute value of the inclination of the downhill slope concerned at the present time is greater than or equal to the inclination reference value (YES in S17), the braking controller 100 determines the magnitude of the power output of the electric supercharger 60 on the basis of the speed of the vehicle 1 at the present time (S18). The braking controller 100 then turns on the electric supercharger 60 (S19) and proceeds to Step S21. The electric supercharger 60 operates at power output of the determined magnitude. The braking controller 100 may determine the magnitude of the power output of the electric supercharger 60 on the basis of both the speed of the vehicle 1 at the present time and the SOC at the present time.

When determining in Step S15 that the SOC at the present time is less than the SOC reference value (NO in S15), the braking controller 100 turns off the electric supercharger 60 (S20) and proceeds to Step S21. When determining in Step S17 that the absolute value of the inclination of the downhill slope concerned at the present time is less than the inclination reference value (NO in S17), the braking controller 100 turns off the electric supercharger 60 (S20) and proceeds to Step S21.

The braking controller 100 may be configured to turn off the electric supercharger 60 when the braking operation mount falls below the braking reference value.

In Step S21, the braking controller 100 determines the magnitude of regenerative braking force on the basis of the demanded braking force and the power output of the electric supercharger 60 (S21). For example, the magnitude of regenerative braking force is determined as follows. When the electric supercharger 60 is in the on-state, the magnitude of regenerative braking force determined by the braking controller 100 is to be less than or equal to the magnitude of the demanded braking force, with the motor-generator 10 generating regenerative electric power corresponding to the power output of the electric supercharger 60. When the electric supercharger 60 is in the off-state, the magnitude of regenerative braking force determined by the braking controller 100 is to be less than or equal to the magnitude of the demanded braking force, with the motor-generator 10 generating its maximum regenerative electric power.

The braking controller 100 then determines the magnitude of engine braking force on the basis of both the number of revolutions of the engine 12 and the power output of the electric supercharger 60 (S22). For example, the magnitude of engine braking force is determined as follows. When the electric supercharger 60 is in the on-state, the magnitude of the engine braking force determined by the braking controller 100 is obtained by adding the braking force being in tune with the power output of the electric supercharger 60 to the braking force being in tune with the number of revolutions of the engine 12. When the electric supercharger 60 is in the off-state, the magnitude of the engine braking force determined by the braking controller 100 is to be in tune with the number of revolutions of the engine 12.

The braking controller 100 determines the magnitude of mechanical braking force by subtracting the engine braking force and the regenerative braking force from the demanded braking force (S23).

Subsequently, the braking controller 100 causes the motor-generator 10, the engine 12, and the brake device 80 to perform braking action (S24) and ends the procedure. For example, the motor-generator 10 is caused to generate regenerative braking force of the determined magnitude. The engine 12 is caused to generate engine braking force of the determined magnitude. The brake device 80 is caused to generate the mechanical braking force of the determined magnitude.

As described above, the electric supercharger 60 of the vehicle 1 according to the first embodiment transitions into the on-state on conditions that 1) the braking operation is detected, 2) the absolute value of the inclination of a downhill slope is greater than or equal to the predetermined inclination reference value, and 3) the SOC is greater than or equal to a predetermined SOC reference value. When being in the on-state, the electric supercharger 60 can consume the regenerative electric power generated by the motor-generator 10 such that the exertion of the regenerative braking force generated by the motor-generator 10 is made possible.

The vehicle 1 according to the first embodiment thus enables appropriate application of brakes at a relatively high level of SOC when traveling a downhill slope.

Second Embodiment

Figure 5:
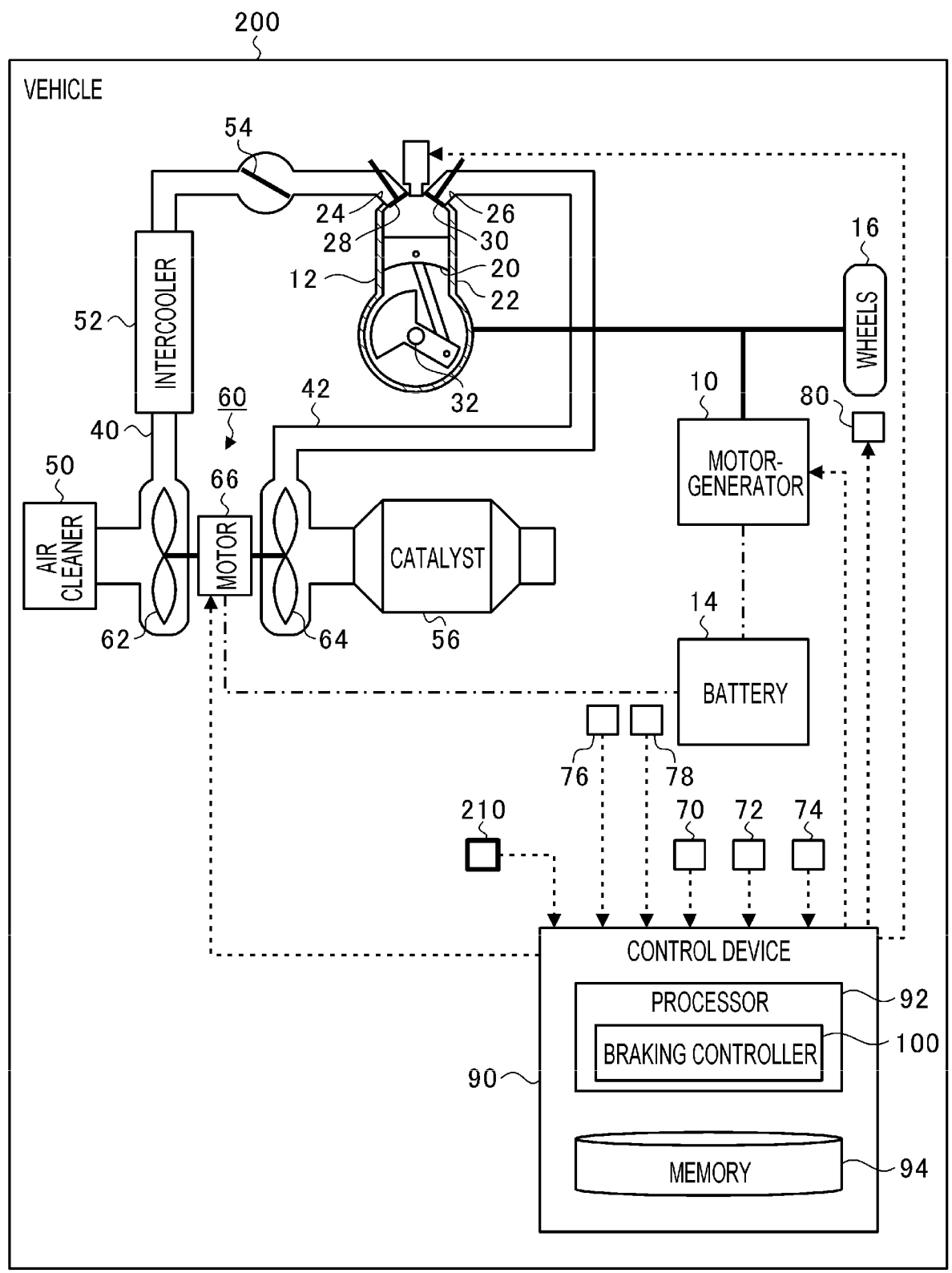
FIG. 5 is a schematic diagram illustrating the configuration of a vehicle according to an embodiment.

FIG. 5 is a schematic diagram illustrating the configuration of a vehicle 200 according to a second embodiment. The differences between the vehicle 1 according to the first embodiment and the vehicle 200 according to the second embodiment are in the presence or absence of a switch 210 and in the details of the control that is to be exercised by the braking controller 100. The vehicle 200 according to the second embodiment is otherwise similar to the vehicle 1 according to the first embodiment and will be described with a focus on the differences.

The switch 210 may be a hill-descent switch. The switch 210 is set to the on-state or off-state in accordance with an input operation performed by the driver. For example, the switch 210 is set to the on-state by the driver when the vehicle 200 travels a downhill slope.

When the switch 210 is in the on-state, the braking controller 100 keeps the vehicle speed from exceeding a predetermined value. Thus, the driver can eliminate or reduce the possibility of an excessive increase in vehicle speed by setting the switch 210 to the on-state when the vehicle 200 travels the downhill slope.

The on-state of the switch 210 can be seen as an indication that the vehicle 200 travels a downhill slope. With this assumption, the braking controller 100 in the second embodiment turns on the electric supercharger 60 on conditions that 1) the switch 210 is in the on-state, and 2) the SOC of the battery 14 is greater than or equal to the predetermined SOC reference value. That is, the electric supercharger 60 in the second embodiment is turned on when it is assumed that the vehicle 200 is traveling a downhill slope in a state in which the SOC is at a relatively high level.

Figure 6:
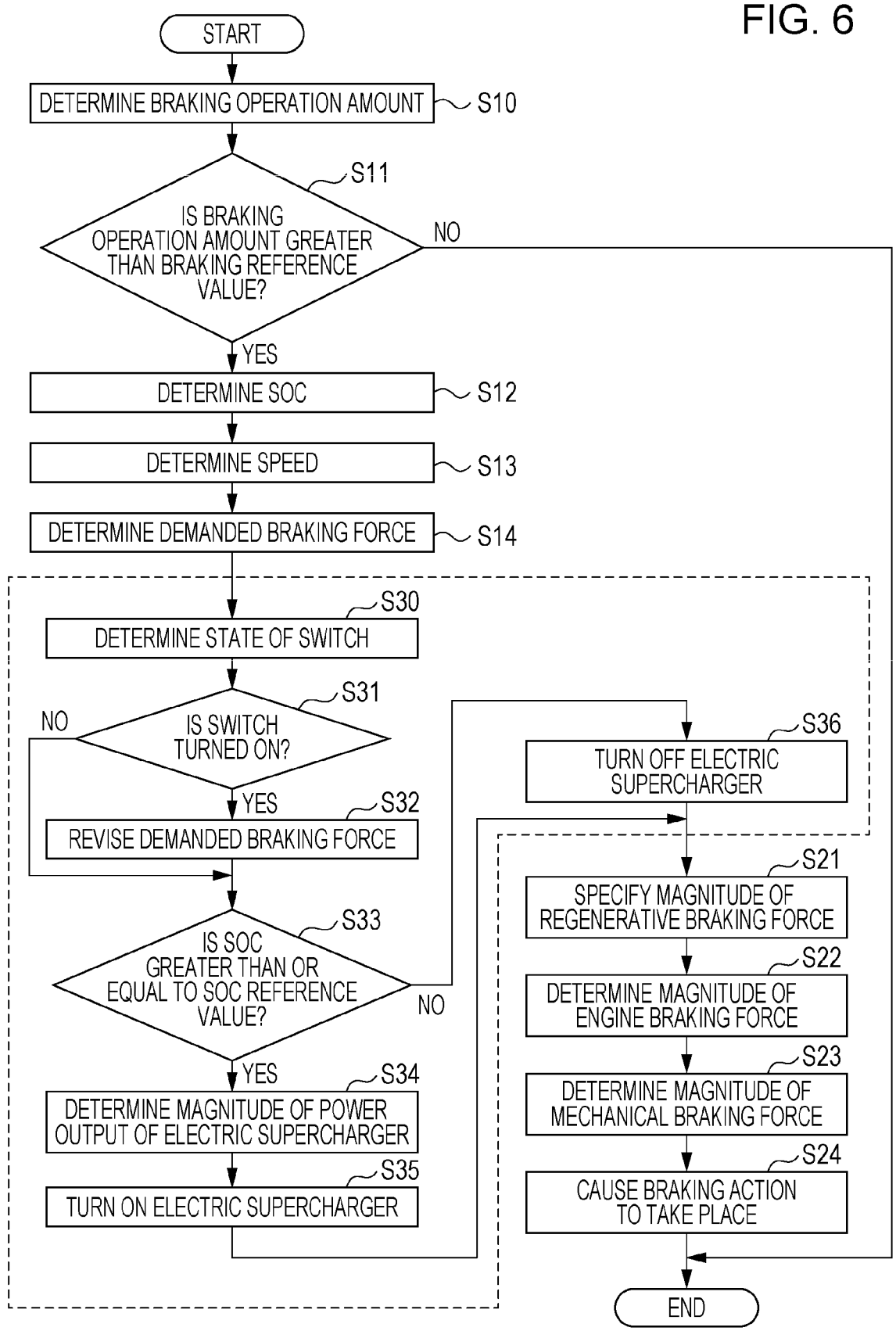
FIG. 6 is a flowchart for describing a procedure that is to be executed by a braking controller in the embodiment.

FIG. 6 is a flowchart for describing a procedure that is to be executed by the braking controller 100 in the second embodiment. The differences between the flowchart in FIG. 4 relevant to the first embodiment and the flowchart in FIG. 6 relevant to the second embodiment are in the steps enclosed with a broken line in FIG. 4. The procedure illustrated in FIG. 6 is otherwise similar to the procedure illustrated in FIG. 4 and will be described with a focus on the differences.

Referring to FIG. 6, the braking controller 100 determines the demanded braking force in Step S14 and then determines the state of the switch 210 at the present time (S30). The braking controller 100 determines whether the switch 210 is in the on-state (S31).

When the switch 210 is in the on-state (YES in S31), the braking controller 100 revises the demanded braking force on the basis of the speed of the vehicle 200 at the present time (S32) and then proceeds to Step S32. When the vehicle speed at the present time is above a predetermined upper limit of vehicle speed, the braking controller 100 revises the demanded braking force upward to such an extent that the vehicle speed is lower than or equal to the predetermined upper limit. The predetermined upper limit is set to an appropriate speed at which the vehicle 200 can safely travel a downhill slope. When the vehicle speed at the present time is lower than or equal to the predetermined upper limit, the braking controller 100 may do away with the step of revising the demanded braking force regardless of whether the switch 210 is in the on-state.

When the switch 210 is in the off-state (NO in S31), the braking controller 100 proceeds to Step S32 without revising the demanded braking force.

In Step S33, the braking controller 100 determines whether the SOC at the present time is greater than or equal to the predetermined SOC reference value (S33). The predetermined SOC reference value is as described above in relation to the first embodiment.

When the SOC at the present time is greater than or equal to the predetermined SOC reference value (YES in S33), the braking controller 100 determines the magnitude of the power output of the electric supercharger 60 on the basis of the speed of the vehicle 200 at the present time (S34). The braking controller 100 then turns on the electric supercharger 60 (S35) and proceeds to Step S21. The electric supercharger 60 operates at power output of the specified magnitude. The braking controller 100 may determine the magnitude of the power output of the electric supercharger 60 on the basis of both the speed of the vehicle 200 at the present time and the SOC at the present time.

When the SOC at the present time is less than the predetermined SOC reference value (NO in S33), the braking controller 100 turns off the electric supercharger 60 (S36) and proceeds to Step S21.

Step S21 and the subsequent steps are as described above with reference to FIG. 4; that is, the braking controller 100 determines the magnitude of regenerative braking force (S21), the magnitude of engine braking force (S22), and the magnitude of mechanical braking force (S23) and then causes the braking action to take place under each braking force of the determined magnitude (S24).

As described above, the electric supercharger 60 of the vehicle 200 according to the second embodiment transitions into the on-state on conditions that 1) the switch 210 is in the on-state, and 2) the SOC of the battery 14 is greater than or equal to the predetermined SOC reference value. When being in the on-state, the electric supercharger 60 can consume the regenerative electric power generated by the motor-generator 10 such that the exertion of the regenerative braking force generated by the motor-generator 10 is made possible. The switch 210 is set to the on-state by the driver when the vehicle 200 travels a downhill slope.

The vehicle 200 according to the second embodiment thus enables appropriate application of brakes at a relatively high level of SOC when traveling a downhill slope.

Third Embodiment

Figure 7:
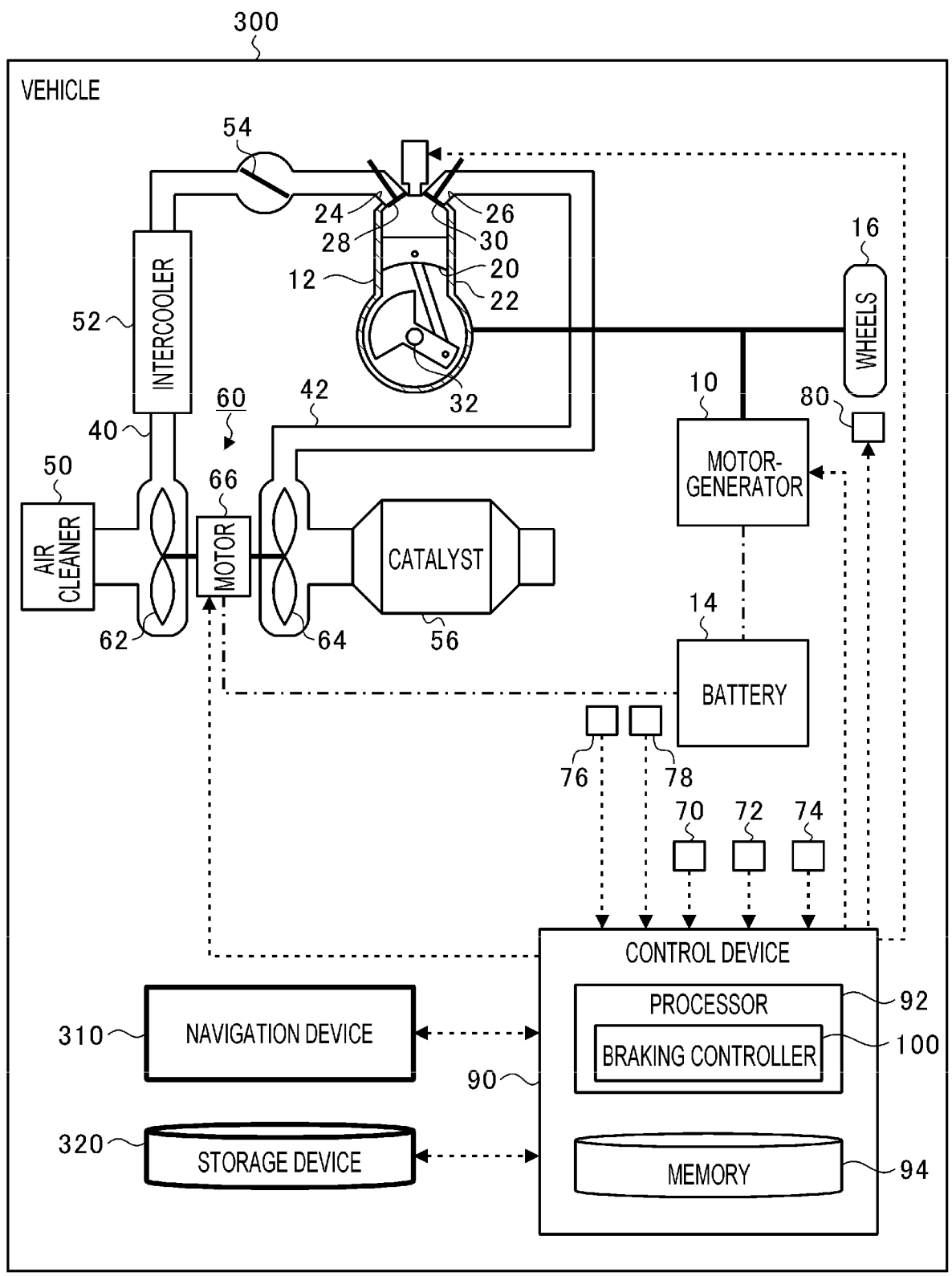
FIG. 7 is a schematic diagram illustrating the configuration of a vehicle according to an embodiment.

FIG. 7 is a schematic diagram illustrating the configuration of a vehicle 300 according to a third embodiment. The differences between the vehicle 1 according to the first embodiment and the vehicle 300 according to the third embodiment are in the presence or absence of a navigation device 310 and a storage device 320 and in the details of the control that is to be exercised by the braking controller 100. The vehicle 300 according to the third embodiment is otherwise similar to the vehicle 1 according to the first embodiment and will be described with a focus on the differences.

The navigation device 310 includes an input device, an output device, and an internal memory. The input device is configured to accept an input operation performed by, for example, the driver. The output device provides various pieces of information to, for example, the driver and may be a display device that displays various pieces of information. The navigation device 310 stores map information in the internal memory. Three-dimensional positional information including latitude, longitude, and altitude is stored as the map information. The navigation device 310 is capable of determining the present position of the vehicle 300 by using a GPS or the like.

The navigation device 310 is capable of determining a route that is a projected path of travel of the vehicle 300. For example, the navigation device 310 designates, at the time of route setting, the present position of the vehicle 300 as the place of departure. When a destination is input through the input device at the time of route setting, the navigation device 310 sets a suitable route on the basis of the place of departure, the destination, and the map information.

The storage device 320 may be a hard disk drive and includes a nonvolatile memory element. For example, the nonvolatile memory element is flash memory that is an electrically readable and writable, nonvolatile memory element.

Figure 8:
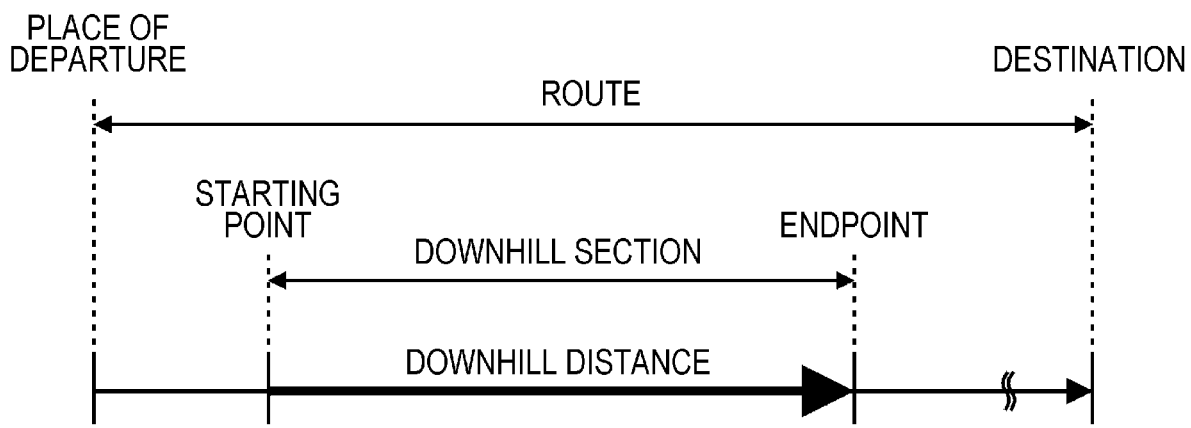
FIG. 8 illustrates an overview of a procedure that is to be gone through in advance by a braking controller in the embodiment.

FIG. 8 illustrates an overview of a procedure that is to be gone through in advance by the braking controller 100 in the third embodiment. Given that a route to follow is determined by the navigation device 310, the braking controller 100 identifies, on the basis of the determined route and the map information, a downhill section in which a downhill slope on the determined route is located. For example, the braking controller 100 identifies a downhill section on the basis of altitudinal changes of the route.

When the vehicle 300 traveling the route reaches the starting point of the downhill section, the braking controller 100 determines the actual value of the SOC at the time of arrival at the starting point. The actual value concerned is hereinafter referred to as starting-point SOC. When the vehicle 300 reaches the endpoint of the downhill section, the braking controller 100 determines the actual value of the SOC at the time of arrival at the endpoint. The actual value concerned is hereinafter referred to as endpoint SOC. The braking controller 100 then subtracts the starting-point SOC from the endpoint SOC to determine the difference between them. The difference is hereinafter referred to as SOC difference. The SOC difference is the fluctuation in SOC in a time period over which the vehicle 300 travels the whole distance of the downhill section.

After calculating the SOC difference, the braking controller 100 divides the SOC difference by a downhill distance to determine SOC per-unit fluctuation. The downhill distance is the distance between the starting point and the endpoint of the downhill section. The SOC per-unit fluctuation is the amount of increase or decrease in the SOC per unit length of the downhill section. The braking controller 100 then stores, into the storage device 320, the SOC per-unit fluctuation in connection with the downhill section and the angle of inclination in the downhill section. The angle of inclination in the downhill section may be determined on the basis of the downhill distance and the difference in altitude between the starting point and the endpoint of the downhill section. The SOC per-unit fluctuation is stored for later use in anticipation of cases where the vehicle 300 will travel the same downhill section in the future.

The braking controller 100 may cumulatively store, into the storage device 320, the SOC per-unit fluctuation every time the vehicle 300 travels the downhill section.

Figure 9:
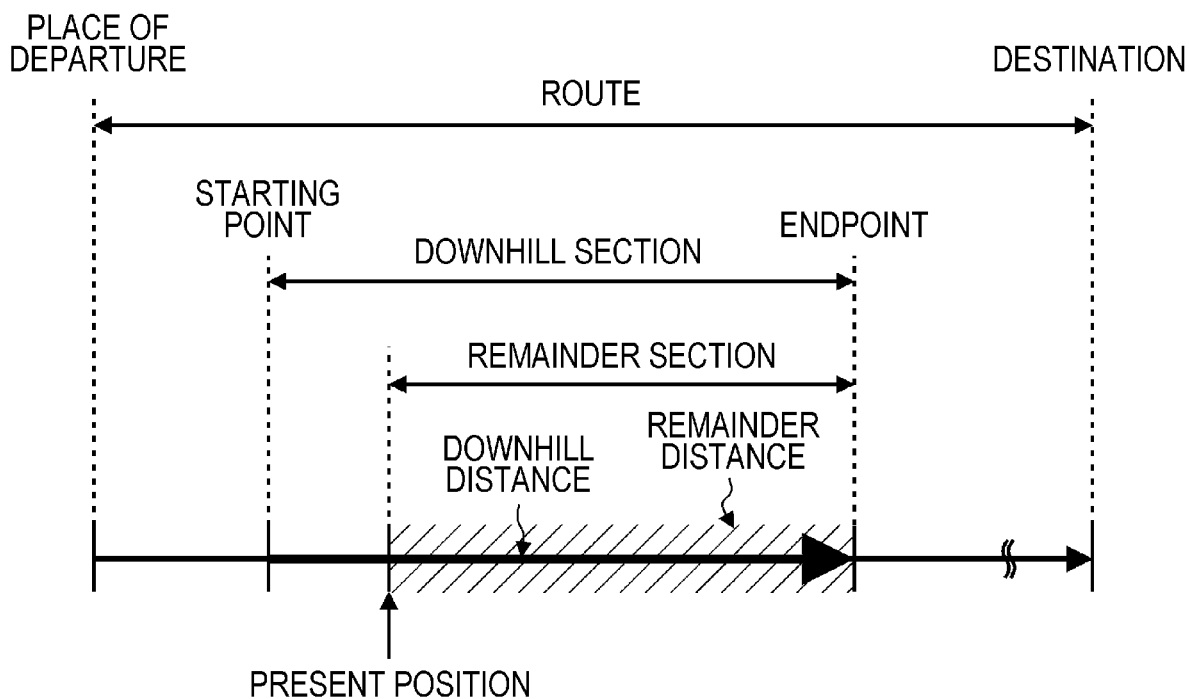
FIG. 9 illustrates an overview of braking control exercised by the braking controller in the embodiment.

FIG. 9 illustrates an overview of braking control exercised by the braking controller 100 in the third embodiment. Referring to FIG. 9, the present position of the vehicle 300 traveling the downhill section of the route is somewhere between the starting point and the endpoint of the downhill section.

A stretch of road starting in the present position within the downhill section and ending in the endpoint of the downhill section is hereinafter also referred to as a remainder section. The length of the section hatched in FIG. 9, that is, the distance from the present position (i.e., the starting point of the remainder section) to the endpoint of the remainder section is hereinafter also referred to as a remainder distance. The remainder section and the remainder distance may be identified on the basis of the downhill section and the present position.

While the vehicle 300 is traveling the downhill section, the braking controller 100 retrieves, from the storage device 320, the SOC per-unit fluctuation that was recorded into the storage device 320 at the point in time when the vehicle 300 traveled the downhill section which the vehicle 300 is currently traveling.

The retrieved SOC per-unit fluctuation is not necessarily the SOC per-unit fluctuation that was recorded at the point in time when the vehicle 300 traveled the downhill section which the vehicle 300 is currently traveling. For example, the braking controller 100 may retrieve the SOC per-unit fluctuation that was recorded at the point in time when the vehicle 300 traveled another downhill section with an angle of inclination equal to the angle of inclination in the downhill section which the vehicle 300 is currently traveling. The angle of inclination in the downhill section currently traveled by the vehicle 300 may be determined on the basis of the downhill distance and the difference in altitude between the starting point and the endpoint of the downhill section currently traveled by the vehicle 300.

After retrieving the prior record of SOC per-unit fluctuation, the braking controller 100 multiplies the SOC per-unit fluctuation by the remainder distance to determine SOC estimated fluctuation associated with the remainder section. The SOC estimated fluctuation is the estimated value of SOC fluctuation that is to be expected for the case in which the vehicle 300 will travel the whole distance of the remainder section in the future.

The braking controller 100 then adds the SOC estimated fluctuation associated with the remainder section to the SOC at the present time to determine endpoint estimated SOC. The endpoint estimated SOC is the estimated value of SOC at the time of the anticipated arrival at the endpoint of the remainder section.

When the endpoint estimated SOC is greater than or equal to the predetermined SOC reference value, the braking controller 100 turns on the electric supercharger 60. The predetermined SOC reference value is as described above in relation to the first embodiment. The electric supercharger of the vehicle 300 according to the third embodiment is turned on when it is estimated that the SOC at the time of the anticipated arrival at the endpoint of the downhill section will be greater than or equal to the SOC reference value. That is, the vehicle 300 according to the third embodiment eliminates or reduces the possibility that the SOC at the time of the anticipated arrival at the endpoint of the downhill section will be too high.

Figure 10:
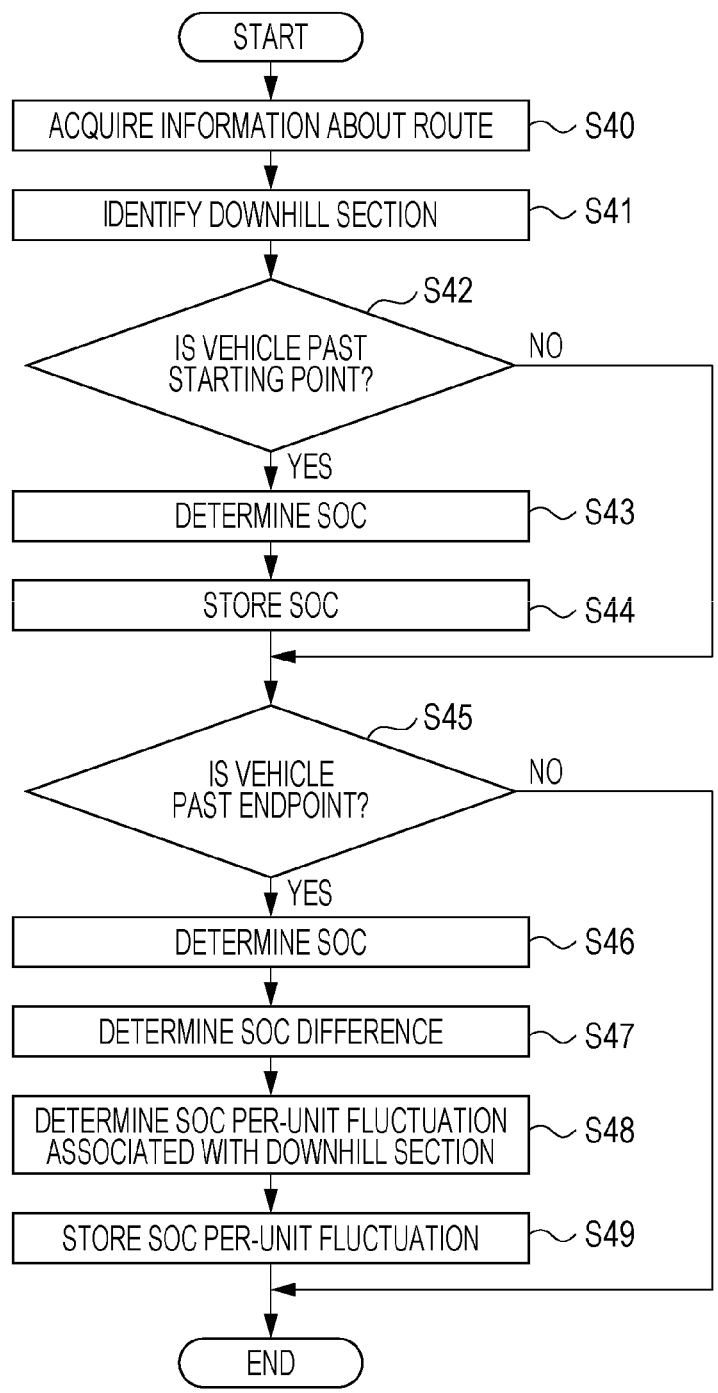
FIG. 10 is a flowchart for describing a procedure that is to be gone through in advance by the braking controller in the embodiment.

FIG. 10 is a flowchart for describing a procedure that is to be gone through in advance by the braking controller 100 in the third embodiment. The braking controller 100 executes the procedure in FIG. 10 periodically (upon the lapse of a predetermined interrupt period).

Upon the lapse of the predetermined interrupt period, the braking controller 100 acquires, from the navigation device 310, information about a current route determined by the navigation device 310 (S40). The braking controller 100 identifies, on the basis of the current route, a downhill section on the current route (S41).

The braking controller 100 then determines whether the current interrupt coincides with the passage of the vehicle 300 through the starting point of the identified downhill section (S42). For example, the braking controller 100 determines the coincidence of the current interrupt and the passage of the vehicle 300 through the starting point when the vehicle 300 on the route is past the starting point at the time of occurrence of the current interrupt following the previous interrupt at which the vehicle 300 on the route was yet to reach the starting point.

When determining that the current interrupt coincides with the passage of the vehicle 300 through the starting point (YES in S42), the braking controller 100 regards the SOC at the present time as the starting-point SOC (S43). The braking controller 100 stores, into the storage device 320, the starting-point SOC in connection with the downhill section (S44) and then proceeds to Step S45.

When determining that the current interrupt does not coincide with the passage of the vehicle 300 through the starting point (NO in S42), the braking controller 100 proceeds to Step S45.

In Step S45, the braking controller 100 determines whether the current interrupt coincides with the passage of the vehicle 300 through the endpoint of the downhill section (S45). For example, the braking controller 100 determines the coincidence of the current interrupt and the passage of the vehicle 300 through the endpoint when the vehicle 300 on the route is past the endpoint at the time of occurrence of the current interrupt following the previous interrupt at which the vehicle 300 on the route was yet to reach the endpoint.

When determining that the current interrupt coincides with the passage of the vehicle 300 through the endpoint (YES in S45), the braking controller 100 regards the SOC at the present time as the endpoint SOC (S46).

The braking controller 100 then determines the SOC difference (S47) by subtracting, from the endpoint SOC, the starting-point SOC stored at the point in time when the vehicle passed through the starting point of the downhill section. Subsequently, the braking controller 100 divides the SOC difference by the downhill distance to determine the SOC per-unit fluctuation associated with the downhill section (S48). The braking controller 100 then stores, into the storage device 320, the endpoint SOC, the SOC difference, and the SOC per-unit fluctuation, in connection with the downhill section and the angle of inclination in the downhill section and ends the procedure. That is, the SOC per-unit fluctuation is stored into the storage device 320 at the point in time when the vehicle covers the whole distance of the downhill section.

When determining that the current interrupt does not coincide with the passage of the vehicle 300 through the endpoint (NO in S45), the braking controller 100 ends the procedure.

Figure 11:
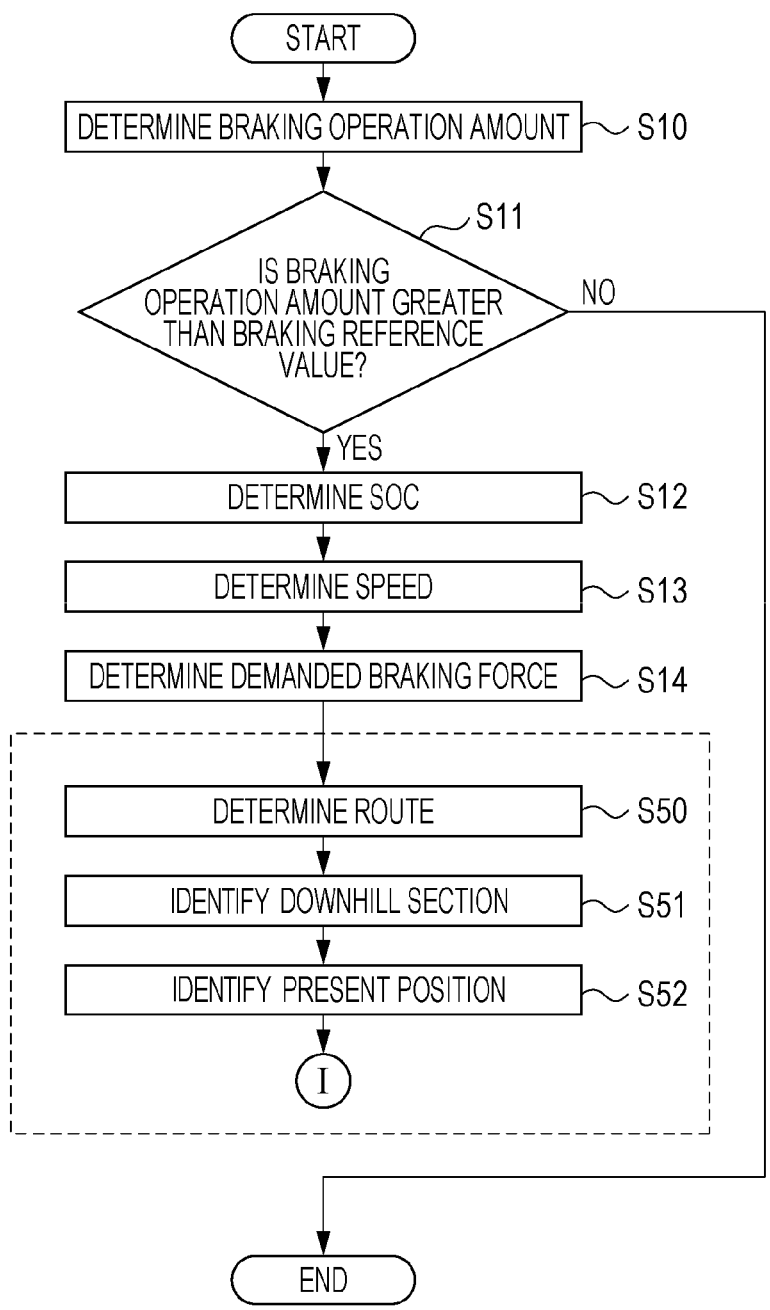
FIG. 11 is part of a flowchart for describing a procedure that is to be executed by the braking controller exercising the braking control in the third embodiment.
Figure 12:
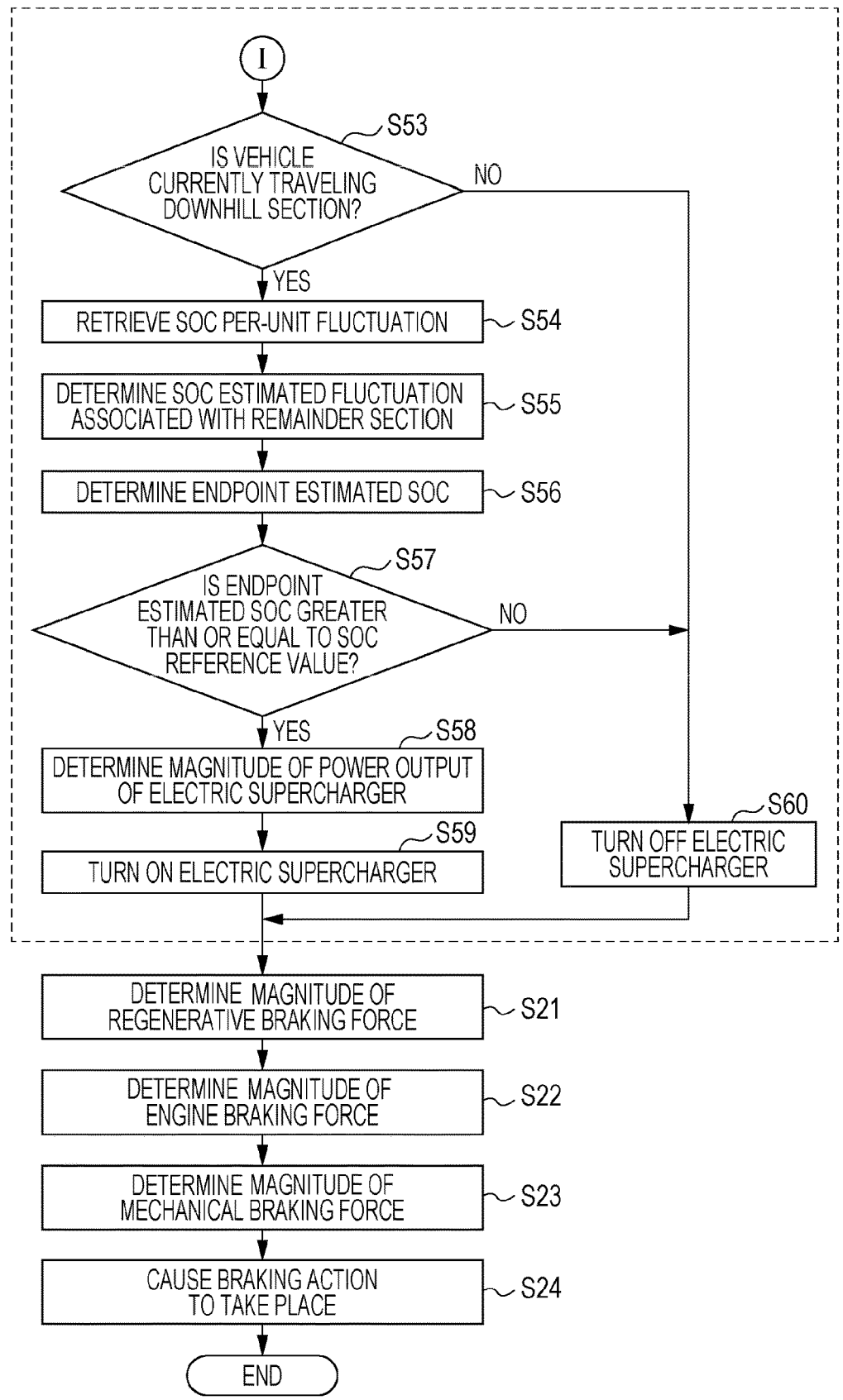
FIG. 12 is part of the flowchart for describing the procedure that is to be executed by the braking controller exercising the braking control in the embodiment.

FIGS. 11 and 12 are a flowchart for describing a procedure that is to be executed by the braking controller 100 exercising the braking control in the third embodiment. FIG. 12 beginning with "I" is a continuation of FIG. 11 ended with "I". The differences between the flowchart in FIG. 4 relevant to the first embodiment and the flowchart in FIGS. 11 and 12 are in the steps enclosed with broken lines in FIGS. 11 and 12. The procedure illustrated in FIGS. 11 and 12 is otherwise similar to the procedure illustrated in FIG. 4 and will be described with a focus on the differences.

Referring to FIG. 11, the braking controller 100 determines the demanded braking force in Step S14 and then retrieves information from the navigation device 310 to determine a route currently followed by the vehicle 300 (S50). After determining the route, the braking controller 100 identifies, on the basis of the route, a downhill section on the route (S51). The braking controller 100 retrieves information from the navigation device 310 to determine the present position of the vehicle 300 (S52) and proceeds to Step S53 in FIG. 12.

In Step S53, the braking controller 100 determines whether the vehicle 300 is currently traveling the downhill section (S53).

When determining that the vehicle 300 is currently traveling the downhill section (YES in S53), the braking controller 100 retrieves, from the storage device 320, the prior record of SOC per-unit (S54). For example, the braking controller 100 retrieves the SOC per-unit fluctuation that was recorded in the past in connection with the downhill section which the vehicle 300 is currently traveling. When the prior record of the SOC per-unit fluctuation associated with the downhill section which the vehicle 300 is currently traveling is not stored in the storage device 320, the braking controller 100 may retrieve the SOC per-unit fluctuation that was recorded at the point in time when the vehicle 300 traveled another downhill section with an angle of inclination equal to the angle of inclination in the downhill section which the vehicle 300 is currently traveling.

The braking controller 100 then identifies a remainder section on the basis of the present position of the vehicle 300 and the downhill section and determines the SOC estimated fluctuation associated with the remainder section by multiplying the retrieved SOC per-unit fluctuation by the remainder distance that is the length of the remainder section (S55). After determining the SOC estimated fluctuation, the braking controller 100 adds the SOC estimated fluctuation to the SOC at the present time to determine endpoint estimated SOC (S56).

Subsequently, the braking controller 100 determines whether the endpoint estimated SOC is greater than or equal to the SOC reference value (S57).

When the endpoint estimated SOC is greater than or equal to the predetermined SOC reference value (YES in S57), the braking controller 100 determines the magnitude of the power output of the electric supercharger 60 on the basis of the speed of the vehicle 300 at the present time (S34). The braking controller 100 turns on the electric supercharger 60 (S59) and proceeds to Step S21. The electric supercharger 60 operates at power output of the determined magnitude. The braking controller 100 may determine the magnitude of the power output of the electric supercharger 60 on the basis of both the speed of the vehicle 300 at the present time and the SOC at the present time.

When the endpoint estimated SOC is less than the SOC reference value (NO in S57), the braking controller 100 turns off the electric supercharger 60 (S60) and proceeds to Step S21.

Step S21 and the subsequent steps are as described above with reference to FIG. 4; that is, the braking controller 100 determines the magnitude of regenerative braking force (S21), the magnitude of engine braking force (S22), and the magnitude of mechanical braking force (S23) and then causes the braking action to take place under each braking force of the determined magnitude (S24).

As described above, the endpoint estimated SOC is determined on the basis of the SOC at the present time while the vehicle 300 according to the third embodiment is traveling the downhill section. When the endpoint estimated SOC is greater than or equal to the predetermined SOC reference value, the electric supercharger 60 is turned on. When being in the on-state, the electric supercharger 60 can consume the regenerative electric power generated by the motor-generator 10 such that the exertion of the regenerative braking force generated by the motor-generator 10 is made possible.

The vehicle 300 according to the third embodiment thus enables appropriate application of brakes at a relatively high level of SOC when traveling a downhill slope.

As mentioned above, the electric supercharger 60 is turned on when the endpoint estimated SOC is greater than or equal to the predetermined SOC reference value. In this way, the vehicle 300 according to the third embodiment eliminates or reduces the possibility that the SOC at the time of the anticipated arrival at the endpoint of the downhill section will be too high.

Fourth Embodiment

Figure 13:
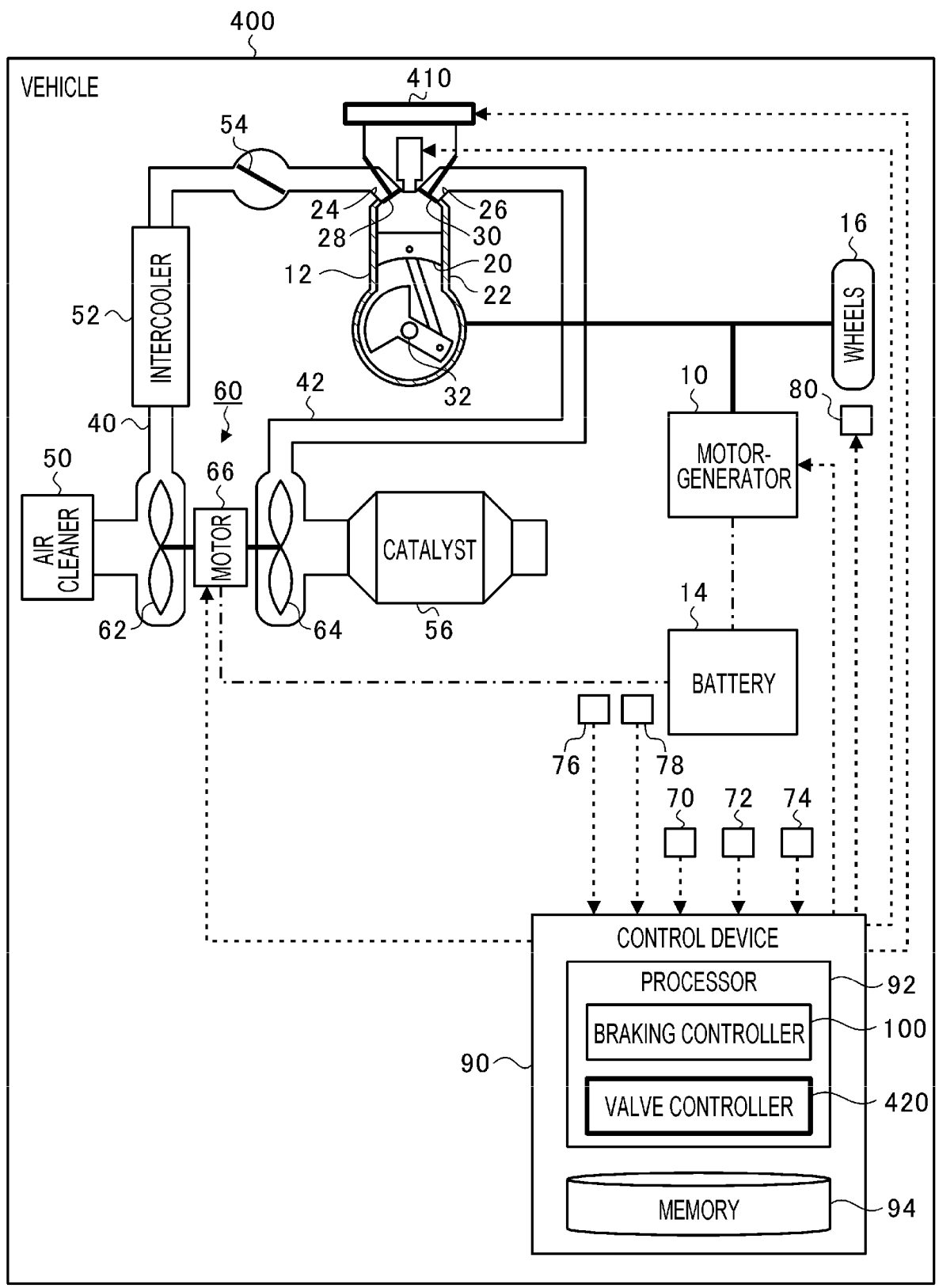
FIG. 13 is a schematic diagram illustrating the configuration of a vehicle according to an embodiment.

FIG. 13 is a schematic diagram illustrating the configuration of a vehicle 400 according to a fourth embodiment.

The vehicle 400 according to the fourth embodiment differs from the vehicle 1 according to the first embodiment in that the vehicle 400 includes a variable valve timing mechanism 410 and a valve controller 420, which is implemented by the processor 92. The vehicle 400 according to the fourth embodiment is otherwise similar to the vehicle 1 according to the first embodiment and will be described with a focus on the differences.

The variable valve timing mechanism 410 is coupled to the intake valve 28 and the exhaust valve 30 of the engine 12. The variable valve timing mechanism 410 is capable of changing the open/close timings of the intake valve 28 and the exhaust valve 30.

When the electric supercharger 60 is in the on-state, the valve controller 420 advances the timing of the closing of the intake valve 28 and defers the timing of the opening of the exhaust valve 30 with respect to the respective timings in the state in which the electric supercharger 60 is in the off-state.

The air fed into the cylinder 22 by the electric supercharger 60 may thus be retained in the cylinder 22 for a longer period of time. Changing the open/close timings of the intake valve 28 and the exhaust valve 30 lengthens the duration of time that the air in the cylinder 22 imparts a resistance to the piston 20. That is, changing the open/close timings of the intake valve 28 and the exhaust valve 30 causes an increase in engine braking force. Accordingly, the proportion of the mechanical braking force is further reduced.

Figure 14:
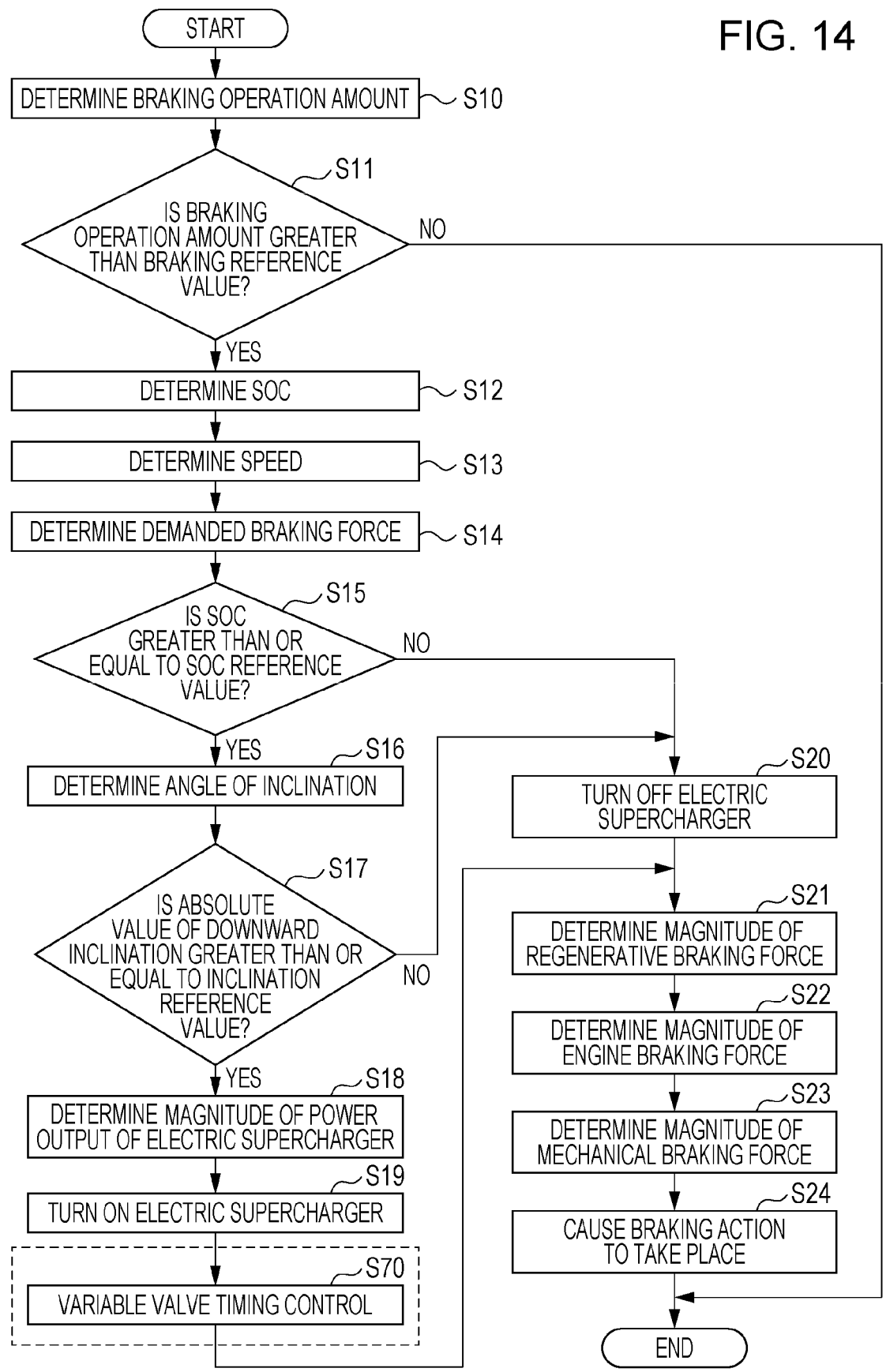
FIG. 14 is a flowchart for describing a procedure that is to be executed by a braking controller and a valve controller in the embodiment.

FIG. 14 is a flowchart for describing a procedure that is to be executed by the braking controller 100 and the valve controller 420 in the fourth embodiment. The differences between the flowchart in FIG. 4 relevant to the first embodiment and the flowchart in FIG. 14 relevant to the fourth embodiment are in the steps enclosed with a broken line in FIG. 14. The procedure illustrated in FIG. 14 is otherwise similar to the procedure illustrated in FIG. 4 and will be described with a focus on the differences.

Referring to FIG. 14, the electric supercharger 60 is turned on in Step S19, and the valve controller 420 then performs variable valve timing control (S70). For example, the variable valve timing mechanism 410 under the control of the valve controller 420 advances the timing of the closing of the intake valve 28 and defers the timing of the opening of the exhaust valve 30 with respect to the respective timings in the state in which the electric supercharger 60 is in the off-state.

Given that the variable timing control is performed in the state in which the electric supercharger 60 in the fourth embodiment is turned on, the magnitude of engine braking force is determined in Step S22 with consideration given to the fact that the engine braking force is increased as a result of the variable valve timing control.

When the electric supercharger 60 of the vehicle 400 according to the fourth embodiment is in the on-state, the timing of the closing of the intake valve 28 is advanced and the timing of the opening of the exhaust valve 30 is deferred with respect to the respective timings in the state in which the electric supercharger 60 is in the off-state. Accordingly, the magnitude of engine braking force is further increased such that the vehicle 400 according to the fourth embodiment can further reduce the proportion of mechanical braking force.

The vehicle 400 according to the fourth embodiment thus enables more appropriate application of brakes at a relatively high level of SOC when traveling a downhill slope.

The vehicle 400 according to the fourth embodiment is obtained by adopting the variable valve timing mechanism 410 and the valve controller 420 into the vehicle 1 according to the first embodiment. Alternatively, the variable valve timing mechanism 410 and the valve controller 420 may be adopted into the vehicle 200 according to the second embodiment or into the vehicle 300 according to the third embodiment.

Embodiments of the disclosure have been described with reference to the accompanying drawings. Needless to say, the disclosure is not limited to the embodiments. It is obvious that variations and modifications can be made by those skilled in the art without departing from the scope hereinafter claimed, and the variations and modifications also fall within the technical scope of the disclosure.

The disclosure enables appropriate application of brakes to a vehicle on a downhill slope.

The invention claimed is:

1. A vehicle comprising:
an engine configured to generate driving force;
a motor-generator configured to generate driving force;
a battery electrically coupled to the motor-generator;
an electric supercharger configured to compress air by using electric power supplied by the battery and to supply the compressed air to the engine;
a navigation device configured to determine a route that is a projected path of travel of the vehicle; and
a control device comprising at least one processor and at least one memory coupled to the at least one processor, wherein
the at least one processor is configured to perform processing comprising:
identifying a downhill section in which a downhill slope on the determined route is located;
while the vehicle is traveling the identified downhill section, determining an endpoint estimated state of charge based on a state of charge of the battery at present time, the endpoint estimated state of charge being an estimated value of the state of charge of the battery at a point in time when the vehicle reaches an endpoint of the downhill section; and
turning on the electric supercharger when the endpoint estimated state of charge is greater than or equal to a predetermined state-of-charge reference value.

2. The vehicle according to claim 1, further comprising a storage device, wherein
the processing further comprising:
when the vehicle has covered a whole distance of the downhill section,
determining a state-of-charge difference by subtracting an actual value of the state of charge of the battery of the vehicle at a starting point of the downhill section from an actual value of the state of charge of the battery of the vehicle at the endpoint of the downhill section,
dividing the state-of-charge difference by the whole distance of the downhill section to determine a state of charge per-unit fluctuation, the state of charge per-unit fluctuation being an amount of increase or decrease in the state of charge per unit length of the downhill section, and
storing the state of charge per-unit fluctuation into the storage device;
while the vehicle is traveling the downhill section,
retrieving a prior record of the state of charge per-unit fluctuation from the storage device and multiplying the retrieved prior record of the state of charge per-unit fluctuation by a distance from a present position of the vehicle in the downhill section to the endpoint of the downhill section to determine a state-of-charge estimated fluctuation, the state-of-charge estimated fluctuation being an estimated fluctuation value of the state of charge expected for the distance from the present position of the vehicle to the endpoint of the downhill section; and while the vehicle is traveling the downhill section,
determining the endpoint estimated state of charge by adding the state of charge estimated fluctuation to the state of charge of the battery at the present time when the vehicle is traveling the downhill section.

3. The vehicle according to claim 2, further comprising a variable valve timing mechanism configured to change a timing of opening or closing an intake valve of the engine and a timing of opening or closing an exhaust valve of the engine, wherein the processing further comprising causing, when the electric supercharger is in an on-state, the variable timing mechanism to advance the timing of closing of the intake valve and to defer the timing of opening of the exhaust valve compared to a state in which the electric supercharger is in an off-state.

4. The vehicle according to claim 1, further comprising a variable valve timing mechanism configured to change a timing of opening or closing an intake valve of the engine and a timing of opening or closing an exhaust valve of the engine, wherein the processing further comprising causing, when the electric supercharger is in an on-state, the variable timing mechanism to advance the timing of closing of the intake valve and to defer the timing of opening of the exhaust valve compared to a state in which the electric supercharger is in an off-state.

5. A vehicle comprising:
an engine configured to generate driving force;
a motor-generator configured to generate driving force;
a battery electrically coupled to the motor-generator;
an electric supercharger configured to compress air by using electric power supplied by the battery and to supply the compressed air to the engine;
a switch configured to be set to an on-state or an off-state in accordance with an input operation performed by a driver who drives the vehicle on a downhill slope; and
a control device comprising at least one processor and at least one memory coupled to the at least one processor, wherein
the at least one processor is configured to perform processing comprising:
keeping speed of the vehicle from exceeding a predetermined value when the switch is in the on-state; and
turning on the electric supercharger when
the switch is in the on-state, and
a state of charge of the battery is greater than or equal to a predetermined state-of-charge reference value.

6. The vehicle according to claim 5, further comprising a variable valve timing mechanism configured to change a timing of opening or closing an intake valve of the engine and a timing of opening or closing an exhaust valve of the engine, wherein the processing further comprising causing, when the electric supercharger is in an on-state, the variable timing mechanism to advance the timing of closing of the intake valve and to defer the timing of opening of the exhaust valve compared to a state in which the electric supercharger is in an off-state.

7. A vehicle comprising:
an engine configured to generate driving force;
a motor-generator configured to generate driving force;
a battery electrically coupled to the motor-generator;
an electric supercharger configured to compress air by using electric power supplied by the battery and to supply the compressed air to the engine;
a braking sensor configured to detect a brake operation performed by a driver who drive the vehicle;
an inclination sensor configured to measure inclination of a road surface on which the vehicle is traveling; and
a control device comprising at least one processor and at least one memory coupled to the at least one processor, wherein
the at least one processor is configured to perform processing comprising turning on the electric supercharger when
the brake operation is detected by the braking sensor,
an absolute value of downward inclination measured by the inclination sensor is greater than or equal to a predetermined inclination reference value, and
a state of charge of the battery is greater than or equal to a predetermined state-of-charge reference value.

8. The vehicle according to claim 7, further comprising a variable valve timing mechanism configured to change a timing of opening or closing an intake valve of the engine and a timing of opening or closing an exhaust valve of the engine, wherein the processing further comprising causing, when the electric supercharger is in an on-state, the variable timing mechanism to advance the timing of closing of the intake valve and to defer the timing of opening of the exhaust valve compared to a state in which the electric supercharger is in an off-state.

* * * * *